US008953594B2

(12) United States Patent  (10) Patent No.: US 8,953,594 B2
Tarrab et al.  (45) Date of Patent: *Feb. 10, 2015

(54) SYSTEMS AND METHODS FOR INCREASING PREAMBLES

(71) Applicant: Broadcom Corporation, Irvine, CA (US)

(72) Inventors: Moshe Tarrab, Yehud (IL); Eliahu Shusterman, Kfar Saba (IL); Yitshak Ohana, Givat Zeev (IL); Avi Kliger, Ramat Gan (IL)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/942,559

(22) Filed: Jul. 15, 2013

(65) Prior Publication Data

US 2013/0301655 A1  Nov. 14, 2013

Related U.S. Application Data

(63) Continuation of application No. 13/031,704, filed on Feb. 22, 2011, now Pat. No. 8,514,860.

(51) Int. Cl.
*H04L 12/56* (2006.01)
*H04L 12/935* (2013.01)
*H04L 12/28* (2006.01)
*H04L 27/26* (2006.01)

(52) U.S. Cl.
CPC ........ *H04L 49/3009* (2013.01); *H04L 12/2801* (2013.01); *H04L 27/2613* (2013.01)
USPC ....................................................... 370/389

(58) Field of Classification Search
USPC .................................................. 370/389, 208
See application file for complete search history.

(56) References Cited

U.S. PATENT DOCUMENTS

| | | | |
|---|---|---|---|
| 3,836,888 A | 9/1974 | Boenke et al. | |
| 4,413,229 A | 11/1983 | Grant | |
| 4,536,875 A | 8/1985 | Kume et al. | |
| 4,608,685 A | 8/1986 | Jain et al. | |
| 4,893,326 A | 1/1990 | Duran et al. | |

(Continued)

FOREIGN PATENT DOCUMENTS

| | | |
|---|---|---|
| CN | 1422043 A | 6/2003 |
| CN | 1588827 A | 3/2005 |

(Continued)

OTHER PUBLICATIONS

Ovadia, "MoCA: Ubiquitous Multimedia Networking in the Home," Proc. of SPIE vol. 6776, 67706C-1, May 28, 2010.

(Continued)

*Primary Examiner* — Dang Ton
*Assistant Examiner* — Mewale Ambaye
(74) *Attorney, Agent, or Firm* — McDermott Will & Emery LLP (57) ABSTRACT

Systems and methods for increasing preambles are provided. In some aspects, an electronic device configured for use as a node in a home network is provided. The electronic device includes a preamble generator configured to generate an outbound preamble for a data signal. The electronic device also includes a preamble increasing circuit configured to increase a size of the outbound preamble based on a switching signal.

20 Claims, 5 Drawing Sheets

(56) References Cited

U.S. PATENT DOCUMENTS

| | | |
|---|---|---|
| 5,170,415 A | 12/1992 | Yoshida et al. |
| 5,343,240 A | 8/1994 | Yu |
| 5,421,030 A | 5/1995 | Baran |
| 5,440,335 A | 8/1995 | Beveridge |
| 5,570,355 A | 10/1996 | Dail et al. |
| 5,638,374 A | 6/1997 | Heath |
| 5,671,220 A | 9/1997 | Tonomura |
| 5,796,739 A | 8/1998 | Kim et al. |
| 5,802,173 A | 9/1998 | Hamilton-Piercy et al. |
| 5,805,591 A | 9/1998 | Naboulsi et al. |
| 5,805,806 A | 9/1998 | McArthur |
| 5,815,662 A | 9/1998 | Ong |
| 5,822,677 A | 10/1998 | Peyrovian |
| 5,822,678 A | 10/1998 | Evanyk |
| 5,845,190 A | 12/1998 | Bushue et al. |
| 5,850,400 A | 12/1998 | Eames et al. |
| 5,854,887 A | 12/1998 | Kindell et al. |
| 5,856,975 A | 1/1999 | Rostoker et al. |
| 5,877,821 A | 3/1999 | Newlin et al. |
| 5,886,732 A | 3/1999 | Humpleman |
| 5,896,556 A | 4/1999 | Moreland et al. |
| 5,917,624 A | 6/1999 | Wagner |
| 5,930,493 A | 7/1999 | Ottesen et al. |
| 5,963,844 A | 10/1999 | Dail |
| 5,982,755 A | 11/1999 | Forrester et al. |
| 5,982,784 A | 11/1999 | Bell |
| 6,009,465 A | 12/1999 | Decker et al. |
| 6,028,860 A | 2/2000 | Laubach et al. |
| 6,055,242 A | 4/2000 | Doshi et al. |
| 6,069,588 A | 5/2000 | O'Neill, Jr. |
| 6,081,519 A | 6/2000 | Petler |
| 6,081,533 A | 6/2000 | Laubach et al. |
| 6,111,911 A | 8/2000 | Sanderford, Jr. et al. |
| 6,118,762 A | 9/2000 | Nomura et al. |
| 6,157,645 A | 12/2000 | Shobatake |
| 6,167,120 A | 12/2000 | Kikinis |
| 6,192,070 B1 | 2/2001 | Poon et al. |
| 6,219,409 B1 | 4/2001 | Smith et al. |
| 6,229,818 B1 | 5/2001 | Bell |
| 6,243,413 B1 | 6/2001 | Beukema |
| 6,304,552 B1 | 10/2001 | Chapman et al. |
| 6,307,862 B1 | 10/2001 | Silverman |
| 6,434,151 B1 | 8/2002 | Caves et al. |
| 6,466,651 B1 | 10/2002 | Dailey |
| 6,481,013 B1 | 11/2002 | Dinwiddie et al. |
| 6,526,070 B1 | 2/2003 | Bernath et al. |
| 6,553,568 B1 | 4/2003 | Fijolek et al. |
| 6,563,829 B1 | 5/2003 | Lyles et al. |
| 6,567,654 B1 | 5/2003 | Coronel Arredondo et al. |
| 6,611,537 B1 | 8/2003 | Edens et al. |
| 6,622,304 B1 | 9/2003 | Carhart |
| 6,637,030 B1 | 10/2003 | Klein |
| 6,650,624 B1 | 11/2003 | Quigley et al. |
| 6,745,392 B1 | 6/2004 | Basawapatna et al. |
| 6,763,032 B1 | 7/2004 | Rabenko et al. |
| 6,785,296 B1 | 8/2004 | Bell |
| 6,816,500 B1 | 11/2004 | Mannette et al. |
| 6,831,899 B1 | 12/2004 | Roy |
| 6,836,515 B1 | 12/2004 | Kay et al. |
| 6,859,899 B2 | 2/2005 | Shalvi et al. |
| 6,862,270 B1 | 3/2005 | Ho |
| 6,873,630 B1 | 3/2005 | Muller et al. |
| 6,877,043 B2 | 4/2005 | Mallory et al. |
| 6,877,166 B1 | 4/2005 | Roeck et al. |
| 6,898,210 B1 | 5/2005 | Cheng et al. |
| 6,930,989 B1 | 8/2005 | Jones IV et al. |
| 6,940,833 B2 | 9/2005 | Jonas et al. |
| 6,950,399 B1 | 9/2005 | Bushmitch et al. |
| 6,961,314 B1 | 11/2005 | Quigley et al. |
| 6,985,437 B1 | 1/2006 | Vogel |
| 6,996,198 B2 | 2/2006 | Cvetkovic |
| 7,035,270 B2 | 4/2006 | Moore, Jr. et al. |
| 7,065,779 B1 | 6/2006 | Crocker et al. |
| 7,089,580 B1 | 8/2006 | Vogel et al. |
| 7,116,685 B2 | 10/2006 | Brown et al. |
| 7,127,734 B1 | 10/2006 | Amit |
| 7,133,697 B2 | 11/2006 | Judd et al. |
| 7,142,553 B1 | 11/2006 | Ojard et al. |
| 7,146,632 B2 | 12/2006 | Miller |
| 7,149,220 B2 | 12/2006 | Beukema et al. |
| 7,194,041 B2 | 3/2007 | Kadous |
| 7,292,527 B2 | 11/2007 | Zhou et al. |
| 7,296,083 B2 | 11/2007 | Barham et al. |
| 7,327,754 B2 | 2/2008 | Mills et al. |
| 7,372,853 B2 | 5/2008 | Sharma et al. |
| 7,460,543 B2 | 12/2008 | Malik et al. |
| 7,487,532 B2 | 2/2009 | Robertson et al. |
| 7,532,642 B1 | 5/2009 | Peacock |
| 7,532,693 B1 | 5/2009 | Narasimhan |
| 7,555,064 B2 | 6/2009 | Beadle |
| 7,574,615 B2 | 8/2009 | Weng et al. |
| 7,606,256 B2 | 10/2009 | Vitebsky et al. |
| 7,652,527 B2 | 1/2010 | Ido et al. |
| 7,653,164 B2 | 1/2010 | Lin et al. |
| 7,664,065 B2 | 2/2010 | Lu |
| 7,675,970 B2 | 3/2010 | Nemiroff et al. |
| 7,697,522 B2 | 4/2010 | Kliger et al. |
| 7,742,495 B2 | 6/2010 | Kliger et al. |
| 7,782,850 B2 | 8/2010 | Kliger et al. |
| 7,783,259 B2 | 8/2010 | Dessert et al. |
| 7,817,642 B2 | 10/2010 | Ma et al. |
| 7,860,092 B2 | 12/2010 | Yoon et al. |
| 7,916,756 B2 | 3/2011 | Atsumi et al. |
| 8,018,832 B2 | 9/2011 | Webster et al. |
| 8,090,043 B2 | 1/2012 | Levi et al. |
| 8,098,770 B2 | 1/2012 | Shusterman |
| 8,184,550 B2 | 5/2012 | Beck et al. |
| 2001/0039660 A1 | 11/2001 | Vasilevsky et al. |
| 2002/0010562 A1 | 1/2002 | Schleiss et al. |
| 2002/0059623 A1 | 5/2002 | Rodriguez et al. |
| 2002/0059634 A1 | 5/2002 | Terry et al. |
| 2002/0069417 A1 | 6/2002 | Kliger et al. |
| 2002/0078247 A1 | 6/2002 | Lu et al. |
| 2002/0078249 A1 | 6/2002 | Lu et al. |
| 2002/0097821 A1 | 7/2002 | Hebron et al. |
| 2002/0105970 A1 | 8/2002 | Shvodian |
| 2002/0136231 A1 | 9/2002 | Leatherbury et al. |
| 2002/0141347 A1 | 10/2002 | Harp et al. |
| 2002/0150155 A1 | 10/2002 | Florentin et al. |
| 2002/0166124 A1 | 11/2002 | Gurantz et al. |
| 2002/0174423 A1 | 11/2002 | Fifield et al. |
| 2002/0194605 A1 | 12/2002 | Cohen et al. |
| 2003/0013453 A1 | 1/2003 | Lavaud et al. |
| 2003/0016751 A1 | 1/2003 | Vetro et al. |
| 2003/0022683 A1 | 1/2003 | Beckmann et al. |
| 2003/0060207 A1 | 3/2003 | Sugaya et al. |
| 2003/0063563 A1 | 4/2003 | Kowalski |
| 2003/0066082 A1 | 4/2003 | Kliger et al. |
| 2003/0099253 A1 | 5/2003 | Kim |
| 2003/0152059 A1 | 8/2003 | Odman |
| 2003/0169769 A1 | 9/2003 | Ho et al. |
| 2003/0193619 A1 | 10/2003 | Farrand |
| 2003/0198244 A1 | 10/2003 | Ho et al. |
| 2004/0004934 A1 | 1/2004 | Zhu et al. |
| 2004/0037366 A1 | 2/2004 | Crawford |
| 2004/0047284 A1 | 3/2004 | Eidson |
| 2004/0107445 A1 | 6/2004 | Amit |
| 2004/0163120 A1 | 8/2004 | Rabenko et al. |
| 2004/0172658 A1 | 9/2004 | Rakib et al. |
| 2004/0177381 A1 | 9/2004 | Kliger et al. |
| 2004/0224715 A1 | 11/2004 | Rosenlof et al. |
| 2004/0258062 A1 | 12/2004 | Narvaez |
| 2005/0015703 A1 | 1/2005 | Terry et al. |
| 2005/0097196 A1 | 5/2005 | Wronski et al. |
| 2005/0152350 A1 | 7/2005 | Sung et al. |
| 2005/0152359 A1 | 7/2005 | Giesberts et al. |
| 2005/0175027 A1 | 8/2005 | Miller et al. |
| 2005/0204066 A9 | 9/2005 | Cohen et al. |
| 2005/0213405 A1 | 9/2005 | Stopler |
| 2005/0281349 A1 | 12/2005 | Kim |
| 2006/0059400 A1 | 3/2006 | Clark et al. |
| 2006/0062250 A1 | 3/2006 | Payne |
| 2006/0078001 A1 | 4/2006 | Chandra et al. |
| 2006/0104201 A1 | 5/2006 | Sundberg et al. |

(56) References Cited

U.S. PATENT DOCUMENTS

| | | |
|---|---|---|
| 2006/0256799 A1 | 11/2006 | Eng |
| 2006/0256818 A1 | 11/2006 | Shvodian et al. |
| 2006/0268934 A1 | 11/2006 | Shimizu et al. |
| 2006/0280194 A1 | 12/2006 | Jang et al. |
| 2007/0025317 A1 | 2/2007 | Bolinth et al. |
| 2007/0040947 A1 | 2/2007 | Koga |
| 2007/0127373 A1 | 6/2007 | Ho et al. |
| 2007/0160213 A1 | 7/2007 | Un et al. |
| 2007/0171919 A1 | 7/2007 | Godman et al. |
| 2007/0183786 A1 | 8/2007 | Hinosugi et al. |
| 2007/0206551 A1 | 9/2007 | Moorti et al. |
| 2007/0217436 A1 | 9/2007 | Markley et al. |
| 2007/0253379 A1 | 11/2007 | Kumar et al. |
| 2007/0286121 A1 | 12/2007 | Kolakowski et al. |
| 2008/0037487 A1 | 2/2008 | Li et al. |
| 2008/0037589 A1 | 2/2008 | Kliger et al. |
| 2008/0080369 A1 | 4/2008 | Sumioka et al. |
| 2008/0089268 A1 | 4/2008 | Kinder et al. |
| 2008/0178229 A1 | 7/2008 | Kliger et al. |
| 2008/0189431 A1 | 8/2008 | Hyslop et al. |
| 2008/0212591 A1 | 9/2008 | Wu et al. |
| 2008/0225832 A1 | 9/2008 | Kaplan et al. |
| 2008/0238016 A1 | 10/2008 | Chen et al. |
| 2008/0271094 A1 | 10/2008 | Kliger et al. |
| 2008/0273591 A1 | 11/2008 | Brooks et al. |
| 2008/0279219 A1 | 11/2008 | Wu et al. |
| 2008/0298241 A1 | 12/2008 | Ohana et al. |
| 2009/0036878 A1 | 2/2009 | Vijfvinkel et al. |
| 2009/0063878 A1 | 3/2009 | Schmidt et al. |
| 2009/0092154 A1 | 4/2009 | Malik et al. |
| 2009/0106801 A1 | 4/2009 | Horii |
| 2009/0122901 A1 | 5/2009 | Choi et al. |
| 2009/0128239 A1 | 5/2009 | Kuijk et al. |
| 2009/0165070 A1 | 6/2009 | McMullin et al. |
| 2009/0217325 A1 | 8/2009 | Kliger et al. |
| 2009/0252172 A1 | 10/2009 | Hare |
| 2009/0254794 A1 | 10/2009 | Malik et al. |
| 2009/0257483 A1 | 10/2009 | French et al. |
| 2009/0285212 A1 | 11/2009 | Chu et al. |
| 2009/0296578 A1 | 12/2009 | Bernard et al. |
| 2009/0316589 A1 | 12/2009 | Shafeeu |
| 2010/0031297 A1 | 2/2010 | Klein et al. |
| 2010/0080312 A1 | 4/2010 | Moffatt et al. |
| 2010/0150016 A1 | 6/2010 | Barr |
| 2010/0158013 A1 | 6/2010 | Kliger et al. |
| 2010/0158015 A1 | 6/2010 | Wu |
| 2010/0158021 A1 | 6/2010 | Kliger et al. |
| 2010/0158022 A1 | 6/2010 | Kliger et al. |
| 2010/0162329 A1 | 6/2010 | Ford et al. |
| 2010/0174824 A1 | 7/2010 | Aloni et al. |
| 2010/0185731 A1 | 7/2010 | Wu |
| 2010/0185759 A1 | 7/2010 | Wu |
| 2010/0238932 A1 | 9/2010 | Kliger et al. |
| 2010/0246586 A1 | 9/2010 | Ohana et al. |
| 2010/0254278 A1 | 10/2010 | Kliger et al. |
| 2010/0254402 A1 | 10/2010 | Kliger et al. |
| 2010/0281195 A1 | 11/2010 | Daniel et al. |
| 2010/0284474 A1 | 11/2010 | Kliger et al. |
| 2010/0290461 A1 | 11/2010 | Kliger et al. |
| 2010/0322134 A1 | 12/2010 | Wu |
| 2011/0001833 A1 | 1/2011 | Grinkemeyer et al. |
| 2011/0013633 A1 | 1/2011 | Klein et al. |
| 2011/0080850 A1 | 4/2011 | Klein et al. |
| 2011/0205891 A1 | 8/2011 | Kliger et al. |
| 2011/0310907 A1 | 12/2011 | Klein et al. |

FOREIGN PATENT DOCUMENTS

| | | |
|---|---|---|
| EP | 0385695 A2 | 9/1990 |
| EP | 0622926 A2 | 11/1994 |
| EP | 1501326 A1 | 1/2005 |
| JP | 60160231 A | 8/1985 |
| WO | WO-98/27748 A2 | 6/1998 |
| WO | WO-98/31133 A2 | 7/1998 |
| WO | WO-99/35753 A2 | 7/1999 |
| WO | WO-99/46734 A1 | 9/1999 |
| WO | WO-00/31725 A1 | 6/2000 |
| WO | WO-00/55843 A1 | 9/2000 |
| WO | WO-01/80030 A1 | 10/2001 |
| WO | WO-02/19623 A2 | 3/2002 |

OTHER PUBLICATIONS

"MoCA Brewing Up Bigger Bandwidth, CTO Anton Monk Outlines Plans for MoCA 2.0 Home-Networking Specification," http://www.multichannel.com/article/160878-MoCa_Brewing_Up_Bigger_Bandwidth.php, Dec. 15, 2008.

Ovadia, "Home Networking on Coax for Video and Multimedia, Overview for IEEE 802.1AVB", May 30, 2007.

"Microtune Introduces Industry's First 1-GHz Cable Tuners Compatible with MoCA—Home Networking Standard," Business Wire, Mar. 19, 2007.

| PHY Rate (Mbps) | MAC Throughput per Number of Nodes | | | | | |
| --- | --- | --- | --- | --- | --- | --- |
| | 2 | 3 | 4 | 5 | 6 | 16 |
| 460 | 350 | 330 | 312 | 294 | 276 | 314 |
| 380 | 300 | 284 | 269 | 253 | 238 | 270 |
| 300 | 243 | 230 | 218 | 205 | 193 | 220 |

SYSTEMS AND METHODS FOR INCREASING PREAMBLES

CROSS-REFERENCES TO RELATED APPLICATIONS

This application is a continuation of U.S. patent application Ser. No. 13/031,704, filed Feb. 22, 2011, now issued as U.S. Pat. No. 8,514,860, entitled "Systems and Methods for Implementing a High Throughput Mode for a MoCA Device," which is a non-provisional of U.S. Provisional Patent Application No. 61/307,044, filed Feb. 23, 2010, entitled "Turbo Mode for MoCA Modem," both of which are incorporated by reference herein in their entirety.

FIELD OF TECHNOLOGY

The present invention relates generally to information networks and specifically to transmitting information such as media information over communication lines such as coaxial cable (hereinafter "coax"), thereby to form a communications network.

BACKGROUND

Home network technologies using coax are known generally. The Multimedia over Coax Alliance (MoCA™), at its website mocalliance.org, provides an example of a suitable specification (MoCA 1.1) for networking of digital video and entertainment through existing coaxial cable in the home which has been distributed to an open membership. The MoCA 1.1 specification is incorporated by reference herein in its entirety.

Home networking over coax taps into the vast amounts of unused bandwidth available on the in-home coax. More than 70% of homes in the United States have coax already installed in the home infrastructure. Many have existing coax in one or more primary entertainment consumption locations such as family rooms, media rooms and master bedrooms—ideal for deploying networks. Home networking technology allows homeowners to utilize this infrastructure as a networking system and to deliver other entertainment and information programming with high QoS (Quality of Service).

The technology underlying home networking over coax provides high speed (270 mbps), high QoS, and the innate security of a shielded, wired connection combined with state of the art packet-level encryption. Coax is designed for carrying high bandwidth video. Today, it is regularly used to securely deliver millions of dollars of pay per view and premium video content on a daily basis. Home networking over coax can also be used as a backbone for multiple wireless access points used to extend the reach of wireless network throughout a consumer's entire home.

Home networking over coax provides a consistent, high throughput, high quality connection through the existing coaxial cables to the places where the video devices currently reside in the home. Home networking over coax provides a primary link for digital entertainment, and may also act in concert with other wired and wireless networks to extend the entertainment experience throughout the home.

Currently, home networking over coax complements access technologies such as ADSL and VDSL services or Fiber to the Home (FTTH), that typically enter the home on a twisted pair or on an optical fiber, operating in a frequency band from a few hundred kilohertz to 8.5 MHz for ADSL and 12 Mhz for VDSL. As services reach the home via xDSL or FTTH, they may be routed via home networking over coax technology and the in-home coax to the video devices. Cable functionalities, such as video, voice and Internet access, may be provided to homes, via coaxial cable, by cable operators, and use coaxial cables running within the homes to reach individual cable service consuming devices locating in various rooms within the home. Typically, home networking over coax type functionalities run in parallel with the cable functionalities, on different frequencies.

It would be desirable to increase the transmission speed of MoCA devices in MoCA networks, such as, for example, the transmission speed of MoCA 1.1 nodes. For the purpose of this application, the term "node" may be referred to alternatively herein as a "module."

SUMMARY

A system and/or method for using a high throughput mode for MoCA devices connected by a MoCA home network, substantially as shown in and/or described in connection with at least one of the figures, as set forth more completely in the claims.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope and spirit of the present invention.

As will be appreciated by one of skill in the art upon reading the following disclosure, various aspects described herein may be embodied as a method, a data processing system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

In addition, various signals representing data or events as described herein may be transferred between a source and a destination in the form of electromagnetic waves traveling through signal-conducting media such as metal wires, optical fibers, and/or wireless transmission media (e.g., air and/or space).

For ease of reference, the following glossary provides definitions for the various abbreviations and notations used in this patent application:

MAC Media Access Controller—includes logic for MoCA integrated circuit that schedules opening and closing of the digital PHY as needed for transmission and/or receiving signals from the receiver and/or transceiver integrated circuit NC MoCA Network Controller PHY Physical Layer of MoCA Network A MoCA modem according to the invention may be used in an electronic device configured as a node in a home network. Such a MoCA modem according to the invention preferably complies with the standard MoCA specifications, such as MoCA 1.1, and includes additional features that enable higher throughput and better robustness in a MoCA network. In one embodiment of the invention, the MoCA modem supports a high throughput mode.

An exemplary high throughput mode of a modem according to the invention preferably uses twice the bandwidth—i.e., 100 MHz instead of 50 MHz—of the MoCA standard mode. It should be noted that a high throughput mode according to the invention may use any higher than standard throughput while still remaining within the scope of the invention.

The implementation of a high throughput mode according to the invention may require some changes in the RF circuitry, such as increasing the band of the anti-aliasing low-pass filters, and some changes in the Digital (Base-Band) modem. Such known changes to the RF circuitry setup may be controlled by the CPU coincident with the operation of the high throughput mode. Such CPU control may include changing several analog and digital parameters such as the bandwidth of the low pass filters (by, for example, switching its capacitors and/or resistors).

In certain embodiments of the invention, a digital modem in high throughput mode may preferably use a doubled frequency operation that creates a wider bandwidth for information throughput.

In such a case—i.e., where the digital modem uses a doubled frequency operation—the effective guard interval provided by the cyclic prefix length and preamble length is reduced in time duration by a factor of two. The guard interval should ideally be bigger than the delay spread of the channel (hereinafter, "the channel delay spread")—i.e., the time between the first and last reflections that substantially impact performance—along the signal transmission line. A decrease in the guard interval, increases ISI (intersymbol interference) and ICI (interserver interference) which may reduce signal acquisition performance.

It should be noted that the time spread is not dependent on MoCA mode operation, whether conventional or high throughput, and this may contribute to the reduction in signal acquisition performance. Hereinafter, this patent application refers to this reduction of signal acquisition performance as the acquisition problem in the high throughput mode.

In order to compensate for the acquisition problem in the high throughput mode, systems and methods according to the invention may, in high throughput mode, preferably increase the preamble length of a packet. ISI and/or ICI distortion may then be reduced back to the level present in the standard MoCA mode.

Such an increase in the preamble length may preferably be implemented using one or more of a number of suitable methods. In one method according to the invention, the preamble may be doubled by adding on a zero sample in an additional portion of the preamble and then transmitting the doubled preamble, with the zeroed second portion of the sample, to the receiver. At the receiver, the doubled preamble may be received. The receiver may then process the first portion of the doubled preamble while disregarding the second, zeroed, portion of the preamble.

Another method that be implemented according to the invention is to duplicate the preamble sample itself, to form a double size preamble sample with two identical parts, at twice the frequency. In such a double size preamble, the receiver may process both portions of the double size preamble or process only the first portion of the double size preamble while disregarding the second, double, portion of the sample.

In either method, the receiver may be adapted to process only the first half of the increased preamble. Such processing preferably retains all the critical information in the preamble while adapting to the increased speed of high throughput mode.

In certain embodiments of the invention, nodes that are adapted to increase the maximum preamble length in high throughput mode may selectively do so. For example, such nodes may increase the maximum preamble length to nodes that are adapted to receive such a high throughput mode and not increase the maximum preamble length in high throughput mode to nodes that are not adapted to receive high throughput mode—e.g., legacy MoCA 1.1 nodes.

Figure 1:
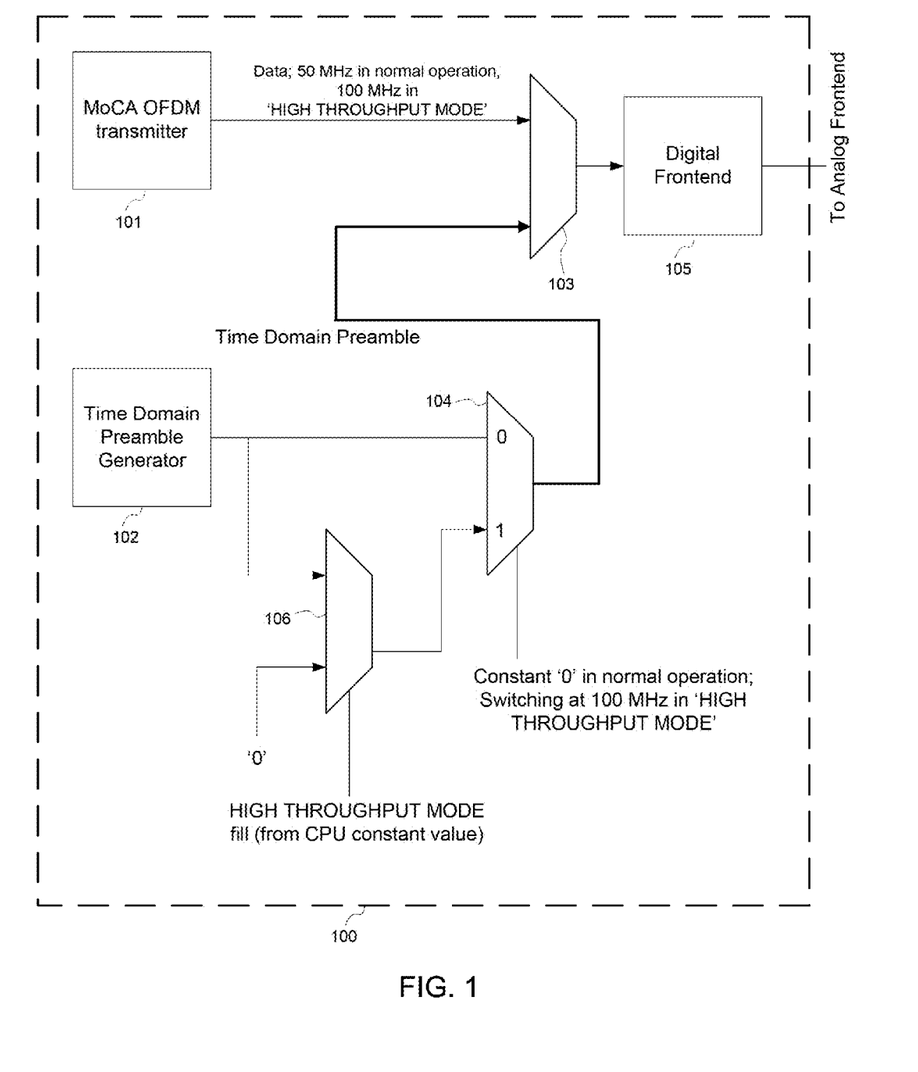
FIG. 1 is a schematic diagram of a high throughput MoCA transmitter according to the invention.

FIG. 1 is a schematic diagram of a high throughput MoCA transmitter according to the invention. One or both of the following two changes may be implemented in the transmitter to support high throughput mode implementation.

In one embodiment of the invention, the windowing block—i.e., the duration of the maximum cyclic prefix—is doubled in order to obtain the same length of time as the legacy maximum periodic prefix. Increasing the maximum cyclic prefix by a factor of two may be performed in any suitable fashion and still be within the scope of the invention. It should be noted that the maximum cyclic prefix may be increased by any suitable proportion and remain within the scope of the invention.

FIG. 1 shows a time domain preamble generator 102 in a transmitter in a generator block 100. The output of the time domain preamble generator 102 is preferably muxed, using multiplexor 103, with the data stream generated by MoCA OFDM transmitter 101. The output of multiplexor 103 is then transmitted to digital front end 105 and from digital frontend 105 to an analog front end.

Generator 102 described in FIG. 1 may be a legacy portion of MoCA 1.1 preamble generator block 100. In legacy (alternatively referred to herein as "normal") transmission mode, generator 102 output can be passed directly to the block output as follows. When the enable line for multiplexor 104 is held to "0", then the signal from generator 102 is preferably passed directly to form the time domain preamble. As such, preferably nothing is changed from normal 50 MHz operation, as is known, and applied to MoCA 1.1.

In systems and methods according to the invention, the preamble can remain unchanged as in normal mode—i.e., the samples are generated at 50 MHz operation as described above or can be time-extended for the high throughput mode—e.g., operation at 100 MHz—in two or more suitable ways. In a first embodiment, the time domain preamble can repeat each sample twice. In a second embodiment, zeros may be inserted after each sample, thereby doubling the length of each sample.

It should be noted that each of the three foregoing options (the conventional option included) may have a different spectral content and different time domain properties.

In some embodiments according to the invention, generator 102 preferably produces a signal that is sent to multiplexor 104 and multiplexor 106. Multiplexor 106 may preferably provide either the preamble from generator 102 as an output, in accordance with an embodiment described above, or a zero as an output, depending on the selection by the enable line of multiplexor 106. The enable line is determined by a value derived from the CPU but may be determined in other suitable ways and still remain within the scope of the invention.

In one embodiment of the high throughput mode according to the invention, the enable line in multiplexor 104 may preferably be switched, in order to produce a switched output between the preamble from generator 102 and the output of multiplexor 106, at a 100 MHz clock. Such switching produces the desired output at 100 MHz.

If multiplexor 106 is configured to output the signal from preamble generator 102 to multiplexor 104, then multiplexor 104's output will produce each sample from the preamble generator twice. If multiplexor 106 is configured to output a zero to multiplexor 104, then multiplexor 104's output will produce each sample from the preamble generator once, followed by a zero.

In normal mode, a constant '0' may be selected by the enable line of multiplexor 104.

Figure 2:
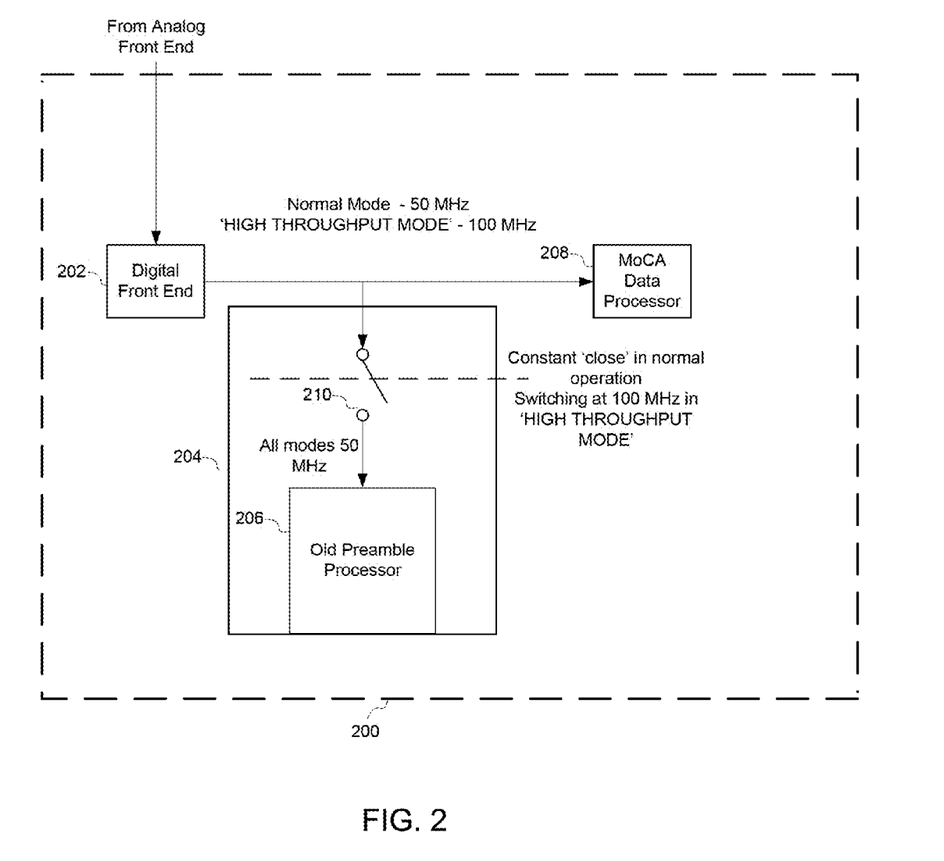
FIG. 2 is a schematic diagram of a high throughput mode MoCA receiver according to the invention.

FIG. 2 is a schematic diagram of a high throughput MoCA mode preamble processor 200 for use in a receiver according to the invention. MoCA preamble processor 200 preferably includes digital front end 202, for implementing a frequency shift, as needed, in the signal coming into the receiver, legacy preamble processor 206, and MoCA Data Processor 208 for implementing Fast Fourier Transform ("FFT"), equalization, decisioning, and any other suitable operations on the received signal.

Receiver 200 may preferably be adapted as follows, or in any other suitable fashion, in order to allow high throughput implementation according to the invention.

As with preamble generator block 100 shown in FIG. 1, the windowing block of preamble processor 200 should be implemented such that the maximum preamble length is doubled, or set to any other suitable proportion, in order to match the doubling of the preamble length at preamble generator block 100.

Further, preamble processor 200 may be modified in accordance with the invention as described below.

The legacy preamble processing block 206 may be associated with the normal MoCA mode. To implement high throughput mode one of the following two options (or any other suitable option) may be implemented: 1) operation as in the legacy mode—i.e., block 206 works at the 50 MHz sample rate (in this mode, block 206 operates to process all received samples from the transmitter via closed switch 210) 2) operation in the high throughput mode wherein each second sample is discarded (in this mode, block 206 operates to process every second received sample from the transmitter via switch 210 and the rest of the circuitry works as in the normal mode.)

It should be noted that a number of parameters that are transferred from the CPU to block 204 are frequency and/or operational mode dependent. Therefore, the instructions sent from the CPU should be calculated accordingly.

Figure 3:
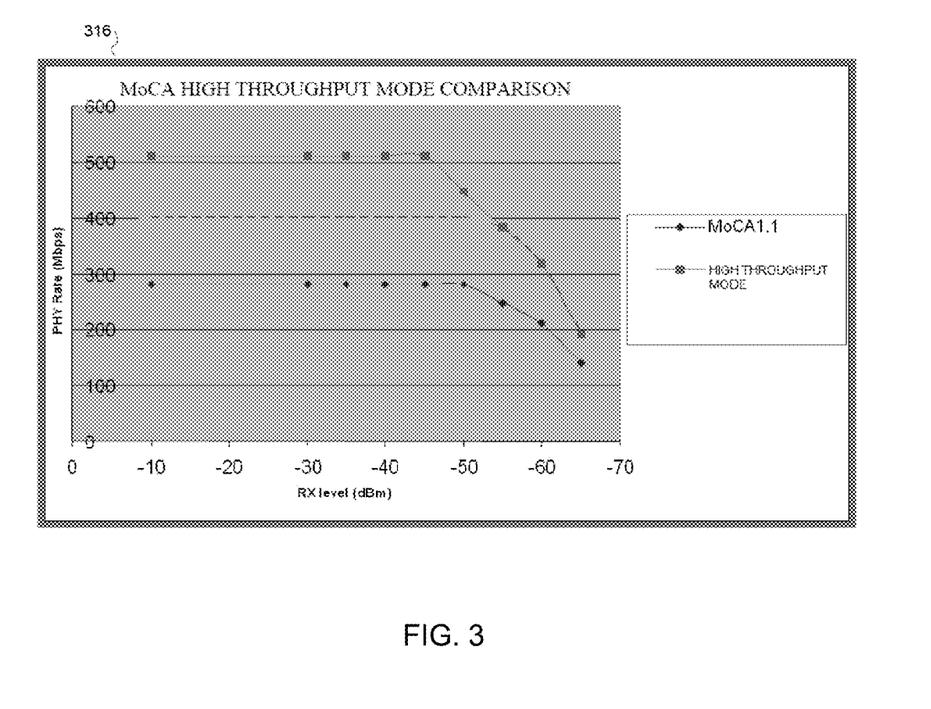
FIG. 3 is a chart of a PHY Rate performance comparison from a legacy MoCA 1.1 Network to a high throughput MoCA 1.1 Network, according to the invention.

FIG. 3 is a chart of a PHY Rate performance comparison 316 from a legacy MoCA 1.1 Network to a high throughput MoCA 1.1 Network, according to the invention. It should be noted that in the operational range from −10 dbm to −50 dbm, a high throughput MoCA 1.1 Network according to the invention may preferably operate at close to 40% higher throughput.

In certain embodiments of the invention, the high throughput mode is an enhanced feature using twice the channel bandwidth to increase PHY and MAC rates, and to provide immunity to impairments. Preferably such a high throughput mode can be implemented on hardware that exists in the current generation of 65 nm chips such as BCM7340/42 and BCM7420 manufactured by Broadcom Corporation of Irvine, Calif.

Such implementations, according to the invention, may exhibit advantages over MoCA 2.0 implementations. Such advantages may include relatively lower complexity as compared to MoCA 2.0 implementations and reduced cost. Preferably, such implementations use the same PHY as MoCA 1.1 but run at double the symbol rate.

Furthermore, the maximal periodic preamble size and time domain preamble series are preferably adjusted while the MAC preferably does not change except to improve efficiency, where needed.

In addition, the systems and methods according to the invention may provide an additional 10 dB margin at maximum MoCA 1.1 PHY Rate (285 Mbps). Furthermore, such systems and methods may be expected to achieve 160 Mbps at a received level less than −50 dBm with the additional margin attributable to selected vendors.

Figure 4:
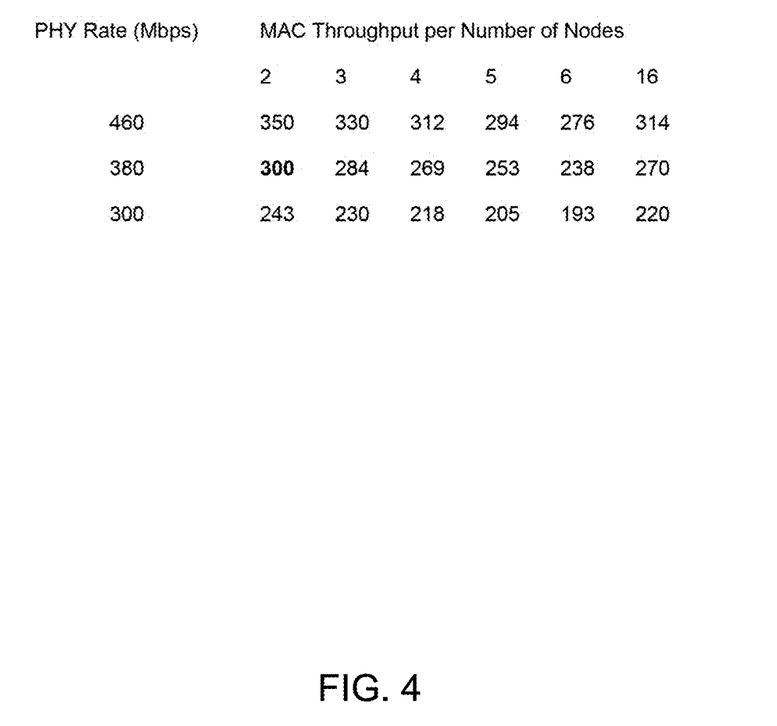
FIG. 4 is a chart showing a rate of MAC throughput per number of legacy network nodes as compared to a high throughput network, according to the invention.

FIG. 4 is a chart showing a rate of MAC throughput per number of legacy network nodes as compared to a high throughput network. It should be noted that for a relatively large number of legacy network nodes, the throughput would decrease. Estimated throughput (MAC rate) as a function of the PHY rate and number of nodes is depicted in FIG. 4. The bolded entry (300 Mbps MAC rate at 380 Mbps PHY Rate) was verified by laboratory measurements.

It should be noted that the high throughput mode may be configured to provide eight 20 Mbps consecutive streams with a received level of less than −60 dBm.

Using high throughput mode according to the invention, MoCA 1.1 may provide an additional 7 dB margin. This is when the MoCA1.1 PHY Rate is 285 Mbps. In one simulation of high throughput mode according to the invention, 120 Mbps throughput was achieved with a received level of −54 dBm. Furthermore, the high throughput mode may reduce limitations on reservation request duration from 52 microseconds (as in MoCA1.1) to about half that amount—i.e., 25-30 microseconds. Moreover, the high throughput preferably increases allows inactive nodes to request opportunities to request transmissions at a lower rate (this reduces overhead associated with reservation requests).

Figure 5:
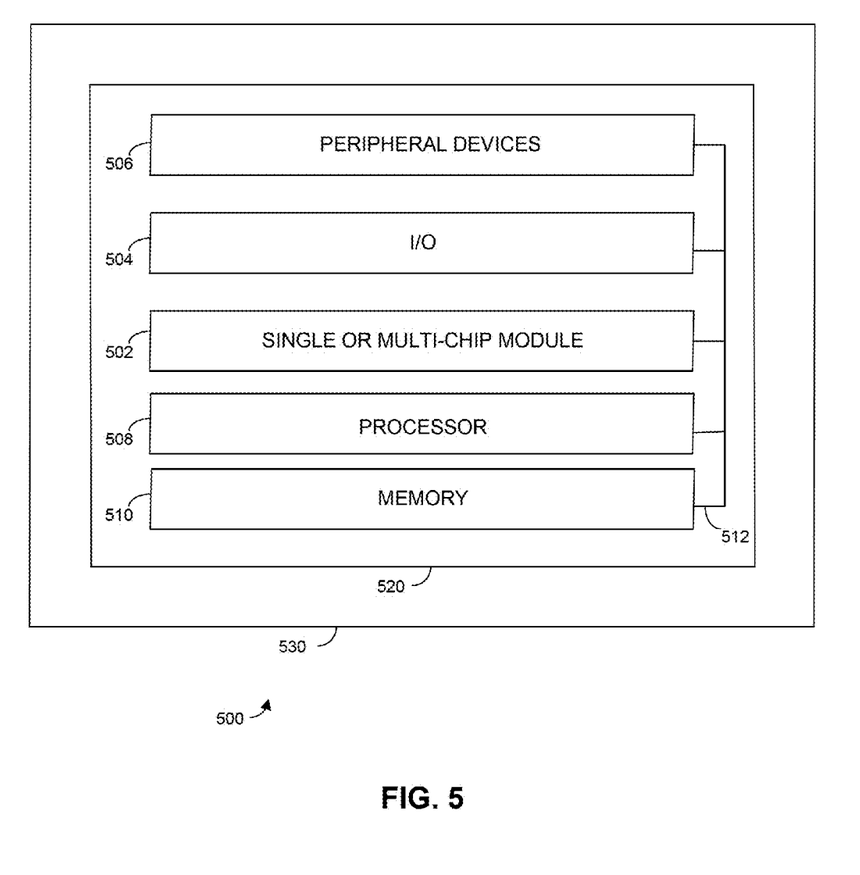
FIG. 5 is a schematic diagram of an illustrative single or multi-chip module of the invention in a data processing system.

FIG. 5 is a schematic diagram of an illustrative single or multi-chip module of the invention in a data processing system. FIG. 5 shows a single or multi-chip module 502 according to the invention, which can be one or more integrated circuits, in an illustrative data processing system 500 according to the invention. Data processing system 500 may include one or more of the following components: I/O circuitry 504, peripheral devices 506, a processor 508 and memory 510. These components are coupled together by a system bus or other interconnections 512 and are populated on a circuit board 520 which is contained in an end-user system 530. System 500 may be configured for use in a cable television tuner according to the invention. It should be noted that system 500 is only exemplary, and that the true scope and spirit of the invention should be indicated by the following claims.

Thus, systems and methods for providing a high throughput mode in MoCA have been described.

Aspects of the invention have been described in terms of illustrative embodiments thereof. A person having ordinary skill in the art will appreciate that numerous additional embodiments, modifications, and variations may exist that remain within the scope and spirit of the appended claims. For example, one of ordinary skill in the art will appreciate that the steps illustrated in the figures may be performed in other than the recited order and that one or more steps illustrated may be optional. The methods and systems of the above-referenced embodiments may also include other additional elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

What is claimed is:

1. An electronic device configured for use as a node in a home network, the electronic device comprising:
    a preamble generator configured to generate an outbound preamble for a data signal; and
    a preamble increasing circuit comprising:
        a first multiplexor configured to receive the outbound preamble from the preamble generator and a preamble increasing signal, the first multiplexor being configured to mux the received outbound preamble with the preamble increasing signal to generate a first output, the first output comprising the received outbound preamble or the preamble increasing signal; and
        a second multiplexor configured to receive the outbound preamble from the preamble generator and the first output from the first multiplexor, the second multiplexor being configured to mux the received outbound preamble with the first output based on a switching signal to generate a second output, the second output comprising the received outbound preamble or the first output,
        wherein the preamble increasing circuit is configured to increase a size of the outbound preamble based on the switching signal.

2. The device of claim 1, wherein the preamble increasing circuit further comprises a switching circuit configured to generate the switching signal.

3. The electronic device of claim 2, wherein the switching circuit is configured to generate the switching signal such that the second output from the second multiplexor comprises the outbound preamble received by the second multiplexor from the preamble generator.

4. The electronic device of claim 2, wherein the switching circuit is configured to generate the switching signal such that the second output from the second multiplexor alternates between the outbound preamble received by the second multiplexor from the preamble generator and the first output from the first multiplexor.

5. The electronic device of claim 4, wherein the switching circuit is configured to generate the switching signal such that the second output from the second multiplexor alternates between the outbound preamble received by the second multiplexor from the preamble generator and the first output from the first multiplexor according to a switching frequency.

6. The electronic device of claim 5, wherein the first output from the first multiplexor comprises the outbound preamble received from the preamble generator.

7. The electronic device of claim 1, wherein the outbound preamble is a periodic preamble.

8. The electronic device of claim 1, wherein the preamble increasing signal comprises a zero signal.

9. The electronic device of claim 1, wherein muxing the received outbound preamble with the preamble increasing signal to generate the first output comprises:
    selecting one of the received outbound preamble or the preamble increasing signal; and
    outputting the selected one of the received outbound preamble or the preamble increasing signal as the first output.

10. The electronic device of claim 1, wherein muxing the received outbound preamble with the first output based on the switching signal to generate the second output comprises:
    selecting one of the received outbound preamble or the first output based on the switching signal; and
    outputting the selected one of the received outbound preamble or the first output as the second output.

11. The electronic device of claim 1, wherein the preamble increasing circuit is configured to double the size of the outbound preamble based on the switching signal.

12. The electronic device of claim 1, wherein the data signal comprises a Multimedia Over Coax Alliance (MoCA) signal.

13. The electronic device of claim 1, further comprising a preamble receiver comprising:
    a switching circuit configured to receive an inbound preamble according to a first rate or a second rate, the second rate being greater than the first rate, the inbound preamble comprising one or more inbound samples, the switching circuit being configured to switch between a closed configuration and an open configuration; and
    a preamble processor coupled to the switching circuit,
    wherein the switching circuit is configured to provide a received inbound sample to the preamble processor in the closed configuration and to discard a received inbound sample in the open configuration,
    wherein the switching circuit is configured to remain in the closed configuration if the inbound preamble is received according to the first rate, and
    wherein the switching circuit is configured to switch between the closed configuration and the open configuration according to a switching frequency if the inbound preamble is received according to the second rate.

14. A method comprising:
    generating an outbound preamble for a data signal;
    receiving, by a first multiplexor, the outbound preamble and a preamble increasing signal;
    muxing, by the first multiplexor, the received outbound preamble with the preamble increasing signal to generate a first output, the first output comprising the received outbound preamble or the preamble increasing signal;
    receiving, by a second multiplexor, the outbound preamble and the first output; and
    muxing, by the second multiplexor, the received outbound preamble with the first output based on a switching signal to generate a second output, the second output comprising the received outbound preamble or the first output,
    wherein a size of the outbound preamble is increased based on the switching signal.

15. The method of claim 14, further comprising generating the switching signal.

16. The method of claim 15, wherein the switching signal is generated such that the second output alternates between the outbound preamble received by the second multiplexor and the first output.

17. The method of claim 16, wherein the switching signal is generated such that the second output alternates between the outbound preamble received by the second multiplexor and the first output according to a switching frequency.

18. The method of claim 14, wherein the preamble increasing signal comprises a zero signal, and wherein the data signal comprises a Multimedia Over Coax Alliance (MoCA) signal.

19. The method of claim 14, wherein muxing, by the first multiplexor, the received outbound preamble with the preamble increasing signal to generate the first output comprises:
   selecting one of the received outbound preamble or the preamble increasing signal; and
   outputting the selected one of the received outbound preamble or the preamble increasing signal as the first output.

20. An electronic device comprising:
   a preamble generator configured to generate an outbound preamble for a data signal;
   a preamble increasing circuit comprising:
      a first multiplexor configured to receive the outbound preamble from the preamble generator and a preamble increasing signal, the first multiplexor being configured to mux the received outbound preamble with the preamble increasing signal to generate a first output, the first output comprising the received outbound preamble or the preamble increasing signal; and
      a second multiplexor configured to receive the outbound preamble from the preamble generator and the first output from the first multiplexor, the second multiplexor being configured to mux the received outbound preamble with the first output based on a switching signal to generate a second output, the second output comprising the received outbound preamble or the first output,
   wherein the preamble increasing circuit is configured to increase a size of the outbound preamble based on the switching signal; and
   a preamble receiver comprising:
      a switching circuit configured to receive an inbound preamble according to a first rate or a second rate, the second rate being greater than the first rate, the inbound preamble comprising one or more inbound samples, the switching circuit being configured to switch between a closed configuration and an open configuration; and
      a preamble processor coupled to the switching circuit,
   wherein the switching circuit is configured to provide a received inbound sample to the preamble processor in the closed configuration and to discard a received inbound sample in the open configuration,
   wherein the switching circuit is configured to remain in the closed configuration if the inbound preamble is received according to the first rate, and
   wherein the switching circuit is configured to switch between the closed configuration and the open configuration according to a switching frequency if the inbound preamble is received according to the second rate.

* * * * *